(12) United States Patent
Lee et al.

(10) Patent No.: US 11,508,188 B2
(45) Date of Patent: Nov. 22, 2022

(54) METHOD AND APPARATUS FOR TESTING LIVENESS (71) Applicant: Samsung Electronics Co., Ltd., Suwon-si (KR)

(72) Inventors: Hana Lee, Suwon-si (KR); Youngjun Kwak, Seoul (KR); Sungheon Park, Suwon-si (KR); Hyeongwook Yang, Suwon-si (KR); Byung In Yoo, Seoul (KR); Juwoan Yoo, Anyang-si (KR); Solae Lee, Suwon-si (KR); Yong-Il Lee, Daejeon (KR); Jiho Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 17/022,451

(22) Filed: Sep. 16, 2020

(65) Prior Publication Data

US 2021/0326616 A1    Oct. 21, 2021

(30) Foreign Application Priority Data

Apr. 16, 2020  (KR) .................. 10-2020-0046273

(51) Int. Cl.
*G06V 40/40*  (2022.01)
*G06N 3/02*  (2006.01)
(Continued)

(52) U.S. Cl.
CPC .............. *G06V 40/45* (2022.01); *G06N 3/02* (2013.01); *G06V 10/56* (2022.01); *G06V 10/60* (2022.01)

(58) Field of Classification Search
CPC .... G06V 40/45; G06V 40/166; G06V 40/168; G06V 10/56; G06V 10/60; G06V 10/147;
(Continued)

(56) References Cited

U.S. PATENT DOCUMENTS

2018/0025217 A1  6/2018  Chandraker et al.
2019/0266388 A1  8/2019  Kolagunda et al.
(Continued)

FOREIGN PATENT DOCUMENTS

CN         109711243 A  *  5/2019  ............... G06N 3/04
KR   10-2010-0135032 A     12/2010
(Continued)

OTHER PUBLICATIONS

Parkin et al. (Parkin, Aleksandr, and Oleg Grinchuk. "Recognizing multi-modal face spoofing with face recognition networks." Proceedings of the IEEE/CVF Conference on Computer Vision and Pattern Recognition Workshops. 2019) (Year: 2019).*

*Primary Examiner* — Edward F Urban
*Assistant Examiner* — Wassim Mahrouka
(74) *Attorney, Agent, or Firm* — NSIP Law (57) ABSTRACT

Disclosed is a method and apparatus for testing a liveness, where the liveness test method includes receiving a color image and a photodiode (PD) image of an object from an image sensor comprising a pixel formed of a plurality of PDs, preprocessing the color image and the PD image, and determining a liveness of the object by inputting a result of preprocessing the color image and a result of preprocessing the PD image into a neural network.

14 Claims, 9 Drawing Sheets

(51) Int. Cl.
 *G06V 10/56* (2022.01)
 *G06V 10/60* (2022.01)
(58) Field of Classification Search
 CPC .......... G06N 3/02; G06N 3/04; G06K 9/6271;
 G06F 21/32
 See application file for complete search history.

(56) References Cited

U.S. PATENT DOCUMENTS

| | | |
|---|---|---|
| 2019/0318154 A1 | 10/2019 | Guo et al. |
| 2019/0332853 A1 | 10/2019 | Price et al. |
| 2019/0370583 A1 | 12/2019 | Van Os et al. |
| 2021/0049391 A1* | 2/2021 | Zou .................... G06K 9/00906 |

FOREIGN PATENT DOCUMENTS

| | | |
|---|---|---|
| KR | 10-2018-0134280 A | 12/2018 |
| WO | WO 2019/056004 A1 | 3/2019 |
| WO | WO 2019/080578 A1 | 5/2019 |
| WO | WO 2019/080580 A1 | 5/2019 |
| WO | WO 2019/110012 A1 | 6/2019 |
| WO | WO 2020/000908 A1 | 1/2020 |
| WO | WO-2020159437 A1 * | 8/2020 |
| WO | WO-2020184763 A1 * | 9/2020 |

\* cited by examiner

METHOD AND APPARATUS FOR TESTING LIVENESS

CROSS-REFERENCE TO RELATED APPLICATIONS

This application claims the benefit under 35 USC § 119(a) of Korean Patent Application No. 10-2020-0046273 filed on Apr. 16, 2020 in the Korean Intellectual Property Office, the entire disclosure of which is incorporated herein by reference for all purposes.

BACKGROUND

Field

The following description relates to testing a liveness using a color image and a photodiode (PD) image at the same time.

Description of Related Art

In a user authentication system, a computing device may determine whether to allow a user to access the computing device based on authentication information provided by the user. The authentication information may include a password input by the user or biometric information of the user. The biometric information includes information may relate to a fingerprint, an iris, a voice, or a face.

Recently, there has been a growing interest in face anti-spoofing technology, to improve security in the user authentication system. Face anti-spoofing determines whether a face of a user that is input into a computing device is a fake face or a genuine face. For this, features such as local binary patterns (LBP), histogram of oriented gradients (HOG), and difference of Gaussians (DoG) are extracted from an input image, and whether an input face is a fake face is determined based on the extracted features. Face spoofing is in the form of attacks using photographs, moving images, or masks, and it is important to identify such attacks in face verification.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a liveness test method, including receiving a color image and a photodiode (PD) image of an object from an image sensor comprising a pixel formed of a plurality of PDs, preprocessing the color image and the PD image, and determining a liveness of the object by inputting a result of preprocessing the color image and a result of preprocessing the PD image into a neural network.

The determining may include calculating a liveness score based on a first output of the neural network with respect to the color image and a second output of the neural network with respect to the PD image, and determining the liveness of the object to be live in response to the liveness score being greater than or equal to a threshold.

The calculating may include obtaining the liveness score by adding a result of multiplying the first output by a first weight of the color image to a result of multiplying the second output by a second weight of the PD image.

The second weight may be based on a distance between the image sensor and the object.

The second weight may be based on a proportion of a region of the object to the PD image.

The second weight may be based on illuminance information of the image sensor.

The determining may include testing a first liveness of the object based on a first output of the neural network with respect to the result of the inputting of the preprocessed color image, determining the liveness of the object to be fake, in response to a result of the testing of the first liveness being fake, and testing a second liveness of the object based on a second output of the neural network with respect to the result of the inputting of the preprocessed PD image, in response to the result of the testing of the first liveness being live.

The determining may include testing a first liveness of the object based on a first output of the neural network with respect to the result of the inputting of the preprocessed color image, determining the liveness of the object to be live, in response to a result of the testing of the first liveness being live, and testing a second liveness of the object based on a second output of the neural network with respect to the result of the inputting of the preprocessed PD image, in response to the result of the testing of the first liveness being fake.

The determining may include testing a first liveness of the object based on a first output of the neural network with respect to the result of the inputting of the preprocessed PD image, determining the liveness of the object to be fake, in response to a result of the testing of the first liveness being fake, and testing a second liveness of the object based on a second output of the neural network with respect to the result of the inputting of the preprocessed color image, in response to the result of the testing of the first liveness being live.

The determining may include testing a first liveness of the object based on a first output of the neural network with respect to the result of the inputting of the preprocessed PD image, determining the liveness of the object to be live, in response to a result of the testing of the first liveness being live, and testing a second liveness of the object based on a second output of the neural network with respect to the result of the inputting of the preprocessed color image, in response to the result of the testing of the first liveness being fake.

In another general aspect, there is provided a liveness test apparatus, including a memory configured to store a color image and a photodiode (PD) image of an object received from an image sensor including a pixel formed of a plurality of PDs, and a processor configured to preprocess the color image and the PD image, and determine a liveness of the object by inputting a result of preprocessing the color image and a result of preprocessing the PD image into a neural network.

The processor may be configured to calculate a liveness score based on a first output of the neural network with respect to the color image and a second output of the neural network with respect to the PD image, and determine the liveness of the object to be live in response to the liveness score being greater than or equal to a threshold.

The processor may be configured to obtain the liveness score by adding a result of multiplying the first output by a first weight of the color image to a result of multiplying the second output by a second weight of the PD image.

The second weight may be based on a proportion of a region of the object to the PD image.

The second weight may be based on illuminance information of the PD image.

The processor may be configured to test a first liveness of the object based on a first output of the neural network with respect to the result of the inputting of the preprocessed color image, determine the liveness of the object to be fake, in response to a result of the testing being fake, and test a second liveness of the object based on a second output of the neural network with respect to the result of the inputting of the preprocessed PD image, in response to the result of the testing being live.

The processor may be configured to test a first liveness of the object based on a first output of the neural network with respect to the result of the inputting of the preprocessed color image, determine the liveness of the object to be live, in response to a result of the testing of the first liveness being live, and test a second liveness of the object based on a second output of the neural network with respect to the result of the inputting of the preprocessed PD image, in response to the result of the testing of the first liveness being fake.

The processor may be configured to test a first liveness of the object based on a first output of the neural network with respect to the result of the inputting of the preprocessed PD image, determine the liveness of the object to be fake, in response to a result of the testing of the first liveness being fake, and test a second liveness of the object based on a second output of the neural network with respect to the result of the inputting of the preprocessed color image, in response to the result of the testing being live.

The processor may be configured to test a first liveness of the object based on a first output of the neural network with respect to the result of the inputting of the preprocessed PD image, determine the liveness of the object to be live, in response to a result of the testing of the first liveness being live, and test a second liveness of the object based on a second output of the neural network with respect to the result the inputting of the preprocessed color image, in response to the result of the testing of the first liveness being fake.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Although terms such as first, second, third, A, B, (a), (b) or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The same name may be used to describe an element included in the examples described above and an element having a common function. Unless otherwise mentioned, the descriptions on the examples may be applicable to the following examples and thus, duplicated descriptions will be omitted for conciseness.

Figure 1:
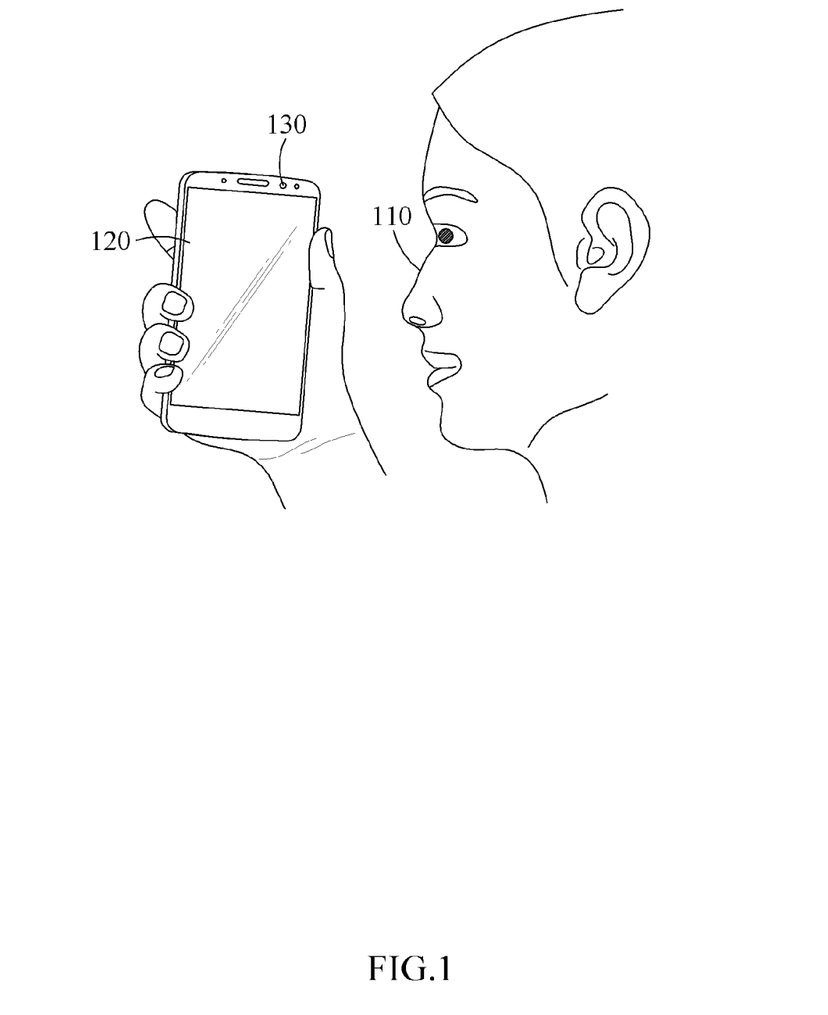
FIG. 1 illustrates an example of testing a liveness of an object using a liveness test apparatus.

FIG. 1 illustrates an example of testing a liveness of an object using a liveness test apparatus.

Biometrics authentication is authentication technology that uses personal biometric information such as fingerprint, iris, face, vein, and skin, among authentication technologies for user verification. In biometrics authentication, face verification is an authentication method that examines whether a user attempting an authentication is a valid user based on face information of the user. Face verification may be used to authenticate a valid user for user login, payment service, and access control.

Referring to FIG. 1, a liveness test apparatus 120 may test a liveness of an object 110 attempting to access the liveness test apparatus 120 through biometrics authentication (for example, face verification). The liveness test apparatus 120 may test the liveness of the object 110 using an image sensor 130 included in the liveness test apparatus 120. Here, the object 110 is a target of which a liveness is to be determined, and generally refers to a person including a user. The image sensor is not limited to a CMOS image sensor or a CCD image sensor, and may include any kind of image sensor.

In an example, the liveness test apparatus 120 may automatically perform the biometrics authentication process and a liveness test using the image sensor 130 when the object 110 perform a separate manipulation of pressing a button or touching a screen to start a biometrics authentication process. In another example, the liveness test apparatus 120 may automatically perform the biometrics authentication process and a liveness test using the image sensor 130, if the object 110 approaches the liveness test apparatus 120.

The liveness test apparatus 120 may test the liveness of the object 110 from images of the object 110. The liveness test apparatus 120 may acquire a color image and a photodiode (PD) image from an image sensor.

The image sensor 120 includes a plurality of PDs that receive light. As the area of the image sensor increases, the area of the PDs that receive light may increase, and thus a photograph with less noise and exuberant colors may be captured. The image sensor may have one or more PD pixels. A case in which a single pixel is divided into two is referred to as 2PD, and a case in which a single pixel is divided into four is referred to as QPD. There may occur a slight difference in viewpoint according to the positions of the PD pixels, and obtained data may include depth information. The number of PD pixels included in one pixel of the image sensor may be greater than or equal to "2", and the number and arrangement features are not limited thereto.

The image sensor characteristically has a variation in performance according to an ambient lighting environment. A color image contains only two-dimensional (2D) information, and thus a liveness test using a color image may fail. Since a color image acquired by the image sensor includes only 2D information, a liveness test using only the color image may not be robust against 2D spoofing attacks using a photograph or a screen.

A PD image including depth information includes three-dimensional (3D) information and thus, may provide a new input modality compared to a color image. The liveness test apparatus 120 may test a liveness using both the color image and the PD image, thereby improving the accuracy of the test.

The liveness test apparatus 120 may perform a liveness test using the color image and the PD image providing the depth information. The liveness test apparatus 120 may compensate for the weakness of being vulnerable to 2D spoofing attacks by performing the liveness test using the color image and the PD images acquired from the image sensor 130. Accordingly, it is possible to effectively prevent false acceptance caused by spoofing technology and improve the accuracy of the liveness test and biometrics authentication.

The liveness test apparatus 120 may perform a liveness test based on the image data acquired using the image sensor 130. The liveness test apparatus 120 may determine a test result by analyzing the image data. The biometrics authentication process including the liveness test process may include, for example, extracting a feature from the image data, comparing the extracted feature with an enrolled feature for a valid user, and determining whether authentication is successful based on a result of the comparing. For example, it is assumed that the liveness test apparatus 120 is locked. In response to the determination that the liveness test of the object 110 is Live and that the biometrics authentication is successful, the liveness test apparatus 120 may be unlocked. Conversely, in response to the determination that the liveness test of the object 110 or the biometrics authentication is failed, the liveness test apparatus 120 continues to remain locked.

A valid user may enroll biometric features of the user in advance to the liveness test apparatus 120 through an enrollment process, and the liveness test apparatus 120 may store information to be used to identify the valid user in a storage device or a cloud storage. For example, a face image of the valid user or a facial feature extracted from the face image may be stored as the enrolled biometric features of the valid user. The stored biometric features may be used in the authentication process after the liveness test.

In the biometrics authentication process as described above, a liveness test may be performed. The liveness test may be performed before or after a biometrics authentication result is determined. In another example, the biometrics authentication process and the liveness test process may be performed together. The liveness test is to examine whether an object being a test subject is an animate object, and to examine whether an authentication means is genuine. For example, the liveness test is to examine whether a face appearing in the image captured by the image sensor 130 is a genuine face of a person or a fake face. The liveness test is used to distinguish between an inanimate object (for example, a photograph, paper, a video, a model, or a mask used as a spoofing means) and an animate object (for example, a real face of a person).

Depending on the example, the liveness test apparatus 120 may perform one of the liveness test and the biometrics authentication, or both the liveness test and the biometrics authentication. The liveness test apparatus 120 may be incorporated in devices, such as, for example, a mobile device, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart vacuum cleaner, a smart home device, a home appliance, a security device for gate control, an ATM authentication system, a walking assistance device, a kiosk, a robot, a biometric door lock, a security device, various Internet of Things (IoT) devices, a vehicle starting device, or any other device capable comprising computing hardware executing instructions or software to perform the operations described in this application that are performed by the methods.

For the liveness test and/or biometrics authentication process, the liveness test apparatus 120 may use the image sensor 130. The liveness test apparatus 120 may automatically detect the approach of the object 110 using the image sensor 130, perform a liveness test based on data sensed by the image sensor 130 in response to sensing the approach of the object 110, and perform biometrics authentication in response to a result of the liveness test satisfying a defined condition.

Figure 2:
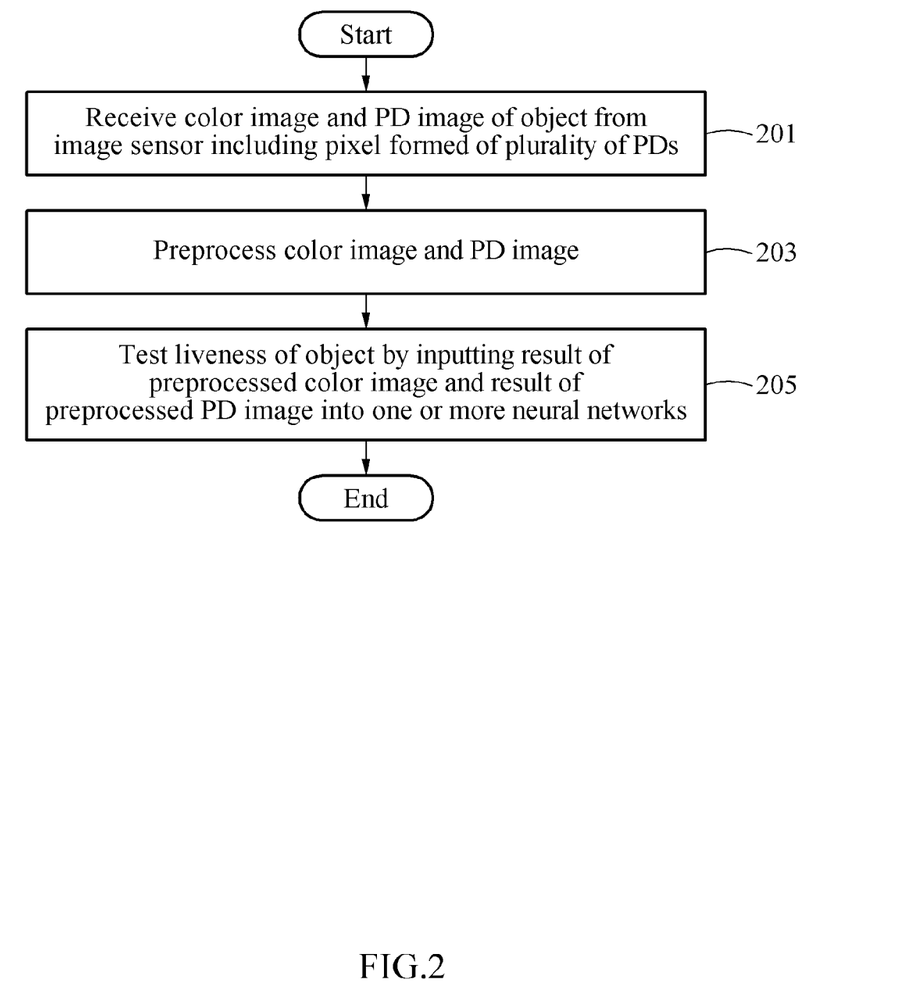
FIG. 2 illustrates an example of a liveness test method.

FIG. 2 illustrates an example of a liveness test method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 201, the liveness test apparatus 120 receives a color image and a PD image of an object from an image sensor including a plurality of PD pixels. The color image includes two-dimensional (2D) information, and the PD image includes three-dimensional (3D) information including depth information.

In operation 203, the liveness test apparatus 120 preprocesses the color image and the PD image. The liveness test apparatus 120 may generate a patch by performing ISP (image signal processing) preprocessing on the color image. The liveness test apparatus 120 may generate a patch for a face region by performing preprocessing on the PD image.

In operation 205, the liveness test apparatus 120 tests a liveness of the object by inputting a result of preprocessing the color image and a result of preprocessing the PD image into a neural network. In an example, the liveness test apparatus 120 may input the patch of the color image and the patch of the PD image into respective neural networks. The liveness test apparatus 120 may test the liveness of the object by aggregating outputs of the respective neural networks. In an example, the liveness test apparatus 120 outputs Live in response to the determination that the object is alive, and outputs Fake in response to the determination that the object is forged.

Figure 3:
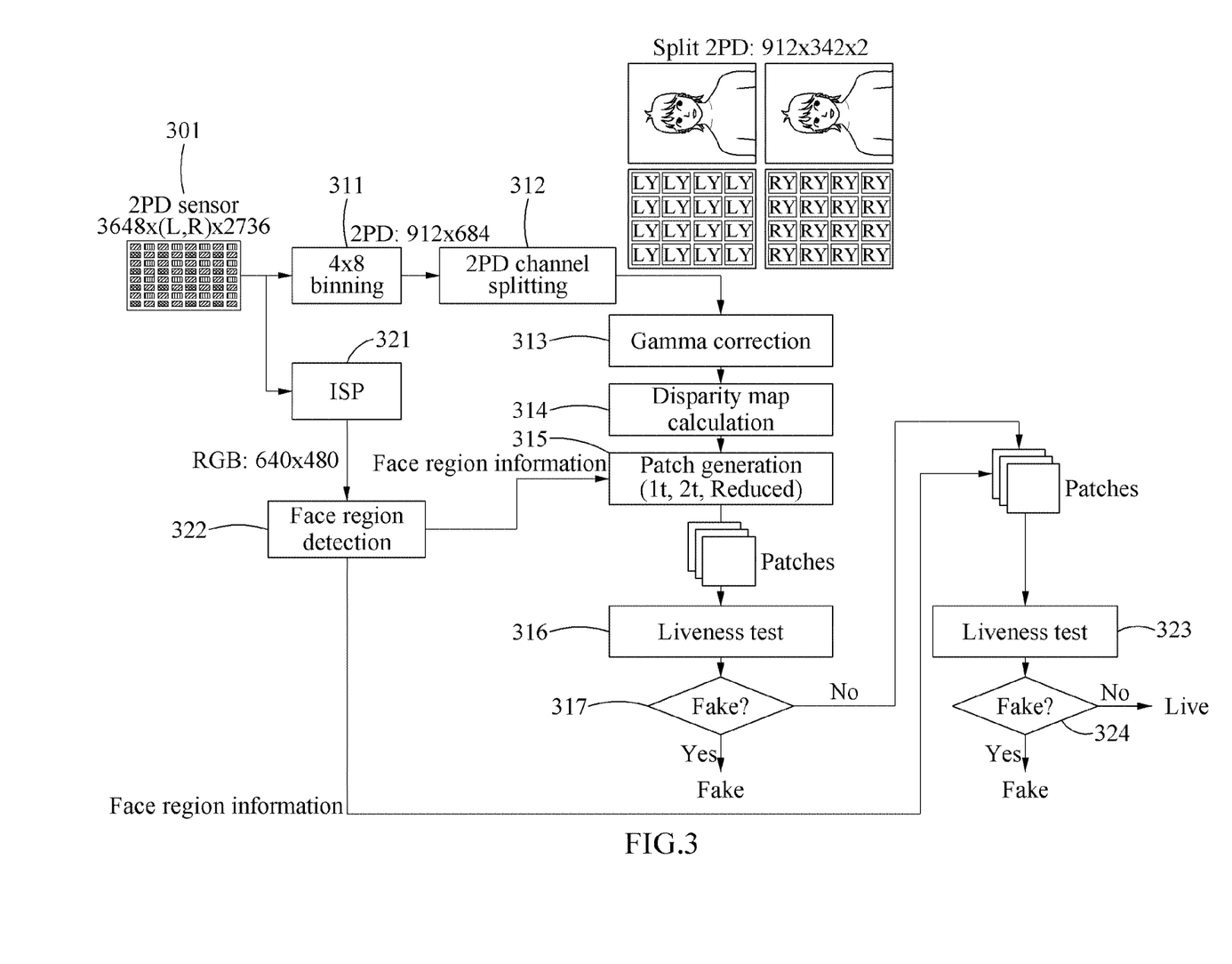
FIG. 3 illustrates an example of a liveness test method.

FIG. 3 illustrates an example of a liveness test method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, such as a processor, that perform the specified functions, or combinations of special purpose hardware and computer instructions. In addition to the description of FIG. 3 below, the descriptions of FIGS. 1-2 are also applicable to FIG. 2, and are incorporated herein by reference. Thus, the above description may not be repeated here.

Referring to FIG. 3, an image sensor may acquire an initial image 301. The initial image may include a color image and a PD image.

The image sensor may be represented in a Bayer pattern. The image sensor includes R, G, and B filters arranged in a pattern. The Bayer pattern is a pattern in which 50% G, 25% R, and 25% B are arranged alternatively, mimicking the human visual characteristics. The image sensor may detect only one of R, G, and B colors in each pixel, but all the R, G, and B colors may be observed for each pixel in an image. Colors of pixels surrounding each pixel may be interpolated by software, such that all the R, G, and B colors may be observed for each pixel in the image. As such, by using the initial Bayer pattern image, the data transmission amount may be greatly reduced, and the number of frames may be increased. Referring to FIG. 3, the PD image may have 3648×(L,R)×2736 dimensions. Here, L denotes image data acquired from a PD pixel disposed on the left side, and R denotes image data acquired from a PD pixel disposed on the right side.

The liveness test apparatus 120 may perform preprocessing on the color image. For example, the liveness test apparatus 120 may perform ISP preprocessing 321 on the color image. Received light is converted into an electrical signal by the image sensor, converted into a digital signal, and then input into an application-specific integrated circuit (ASIC). In an example, the digital signal is input into an ISP and transmitted to a memory after undergoing gamma correction, AWB, interpolation, RGB-to-YUV conversion, and enhancement.

In operation 322, the liveness test apparatus 120 may detect a face region from the result of preprocessing the color image. The liveness test apparatus 120 may obtain face region information.

The liveness test apparatus 120 may perform preprocessing on the PD image. For example, in operation 311, the liveness test apparatus 120 may perform binning on the PD image. The liveness test apparatus 120 may combine pixels of the PD image in a predetermined unit. For example, the liveness test apparatus 120 may perform binning in a unit of 4×8. In this example, a result image obtained through the binning may have a size of 912×684.

In operation 312, the liveness test apparatus 120 may split channels from the result image. For example, the PD image may be split into a left image and a right image. In this example, the split channel images may each have a size of 912×342.

In operation 313, the liveness test apparatus 120 may perform gamma correction on each channel image. The liveness test apparatus 120 may adjust the overall illuminance of the channel images through gamma correction.

In operation 314, the liveness test apparatus 120 may calculate a disparity map using the plurality of channel images. Each of the channel images corresponds to a different viewpoint and thus, may include depth information. The liveness test apparatus 120 may calculate a disparity map including depth information by comparing corresponding coordinates of the channel images.

In operation 315, the liveness test apparatus 120 may generate patches from the color image using the obtained face region information. The patches may be images of various sizes that include a face region. Each patch may be set to be the size of the face region, or to be 2 times as large as the face region, or to be the size of the entire image. Each patch may be normalized to a predetermined size.

In operation 316, the liveness test apparatus 120 may determine a liveness based on the patches of the PD image. For example, the liveness test apparatus 120 may input the patches of the PD image into a neural network. The neural network into which the patches of the PD image are input may be referred to as a PD neural network.

In operation 317, the liveness test apparatus 120 may determine the liveness of the object based on an output of the neural network. For example, if the output is less than a threshold, the liveness test apparatus 120 may determine the liveness to be Fake, and if the output is greater than or equal to the threshold, the liveness test apparatus 120 may perform a subsequent operation.

The liveness test apparatus 120 may generate one or more patches for the color image from the face region information. The patches may be images of various sizes that include a face region. Each patch may be set to be the size of the face region, or to be 2 times as large as the face region, or to be the size of the entire image. Each patch may be normalized to a predetermined size.

In operation 323, the liveness test apparatus 120 may determine the liveness based on the patches of the color image. For example, the liveness test apparatus 120 may input the patches of the color image into a neural network. The neural network into which the patches of the color image are input may be referred to as a color neural network.

In operation 324, the liveness test apparatus 120 may determine the liveness of the object based on an output of the neural network. For example, if the output is less than a threshold, the liveness test apparatus 120 may determine the liveness to be Fake, and if the output is greater than or equal to the threshold, the liveness test apparatus 120 may determine the liveness to be Live.

Figure 4:
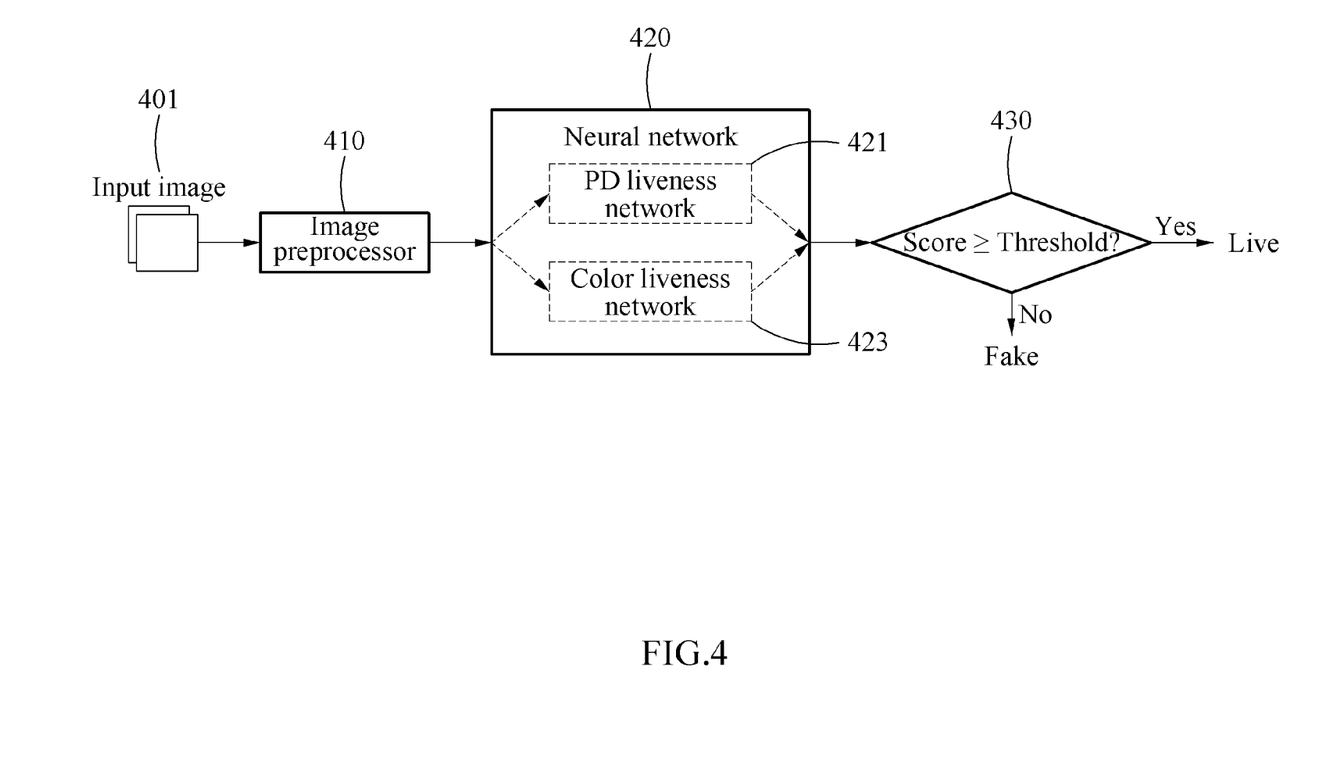
FIG. 4 illustrates an example of testing a liveness by calculating a liveness score.

FIG. 4 illustrates an example of testing a liveness by calculating a liveness score. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

The liveness test apparatus 120 may determine a liveness from a color image and a PD image, respectively, and determine a final liveness based on a score.

The liveness test apparatus 120 may input an input image 401 including the color image and the PD image into an image preprocessor 410. The liveness test apparatus 120 may perform preprocessing on each of the color image and the PD image and output preprocessing results.

The liveness test apparatus 120 may calculate a liveness score based on a first output of a PD liveness network 421 with respect to the result of the preprocessed color image and a second output of a color liveness network 423 with respect to the result of the preprocessed PD image.

In operation 430, the liveness test apparatus 120 may determine the liveness based on the score. The liveness test apparatus 120 may determine the liveness to be Live in response to the liveness score being greater than or equal to a threshold. The liveness test apparatus 120 may determine the liveness to be Fake in response to the liveness score being less than the threshold.

The liveness test apparatus 120 may obtain the liveness score by adding a result of multiplying the first output by a first weight of the color image to a result of multiplying the second output by a second weight of the PD image. In an example, the second weight may be determined based on a distance between the image sensor and the object. For example, the distance between the image sensor and the object may be determined based on a proportion of a region of the object to the PD image. The proportion of the region of the object to the PD image may reflect the distance between the image sensor and the object, and the PD image may provide optimal depth information in a specific distance range.

As another example, the second weight may be determined based on illuminance information of the image sensor. The PD image may provide optimal depth information at a predetermined illuminance. The second weight may be set to a higher value as the illuminance of the image sensor becomes more similar to the optimal illuminance.

Figure 5:
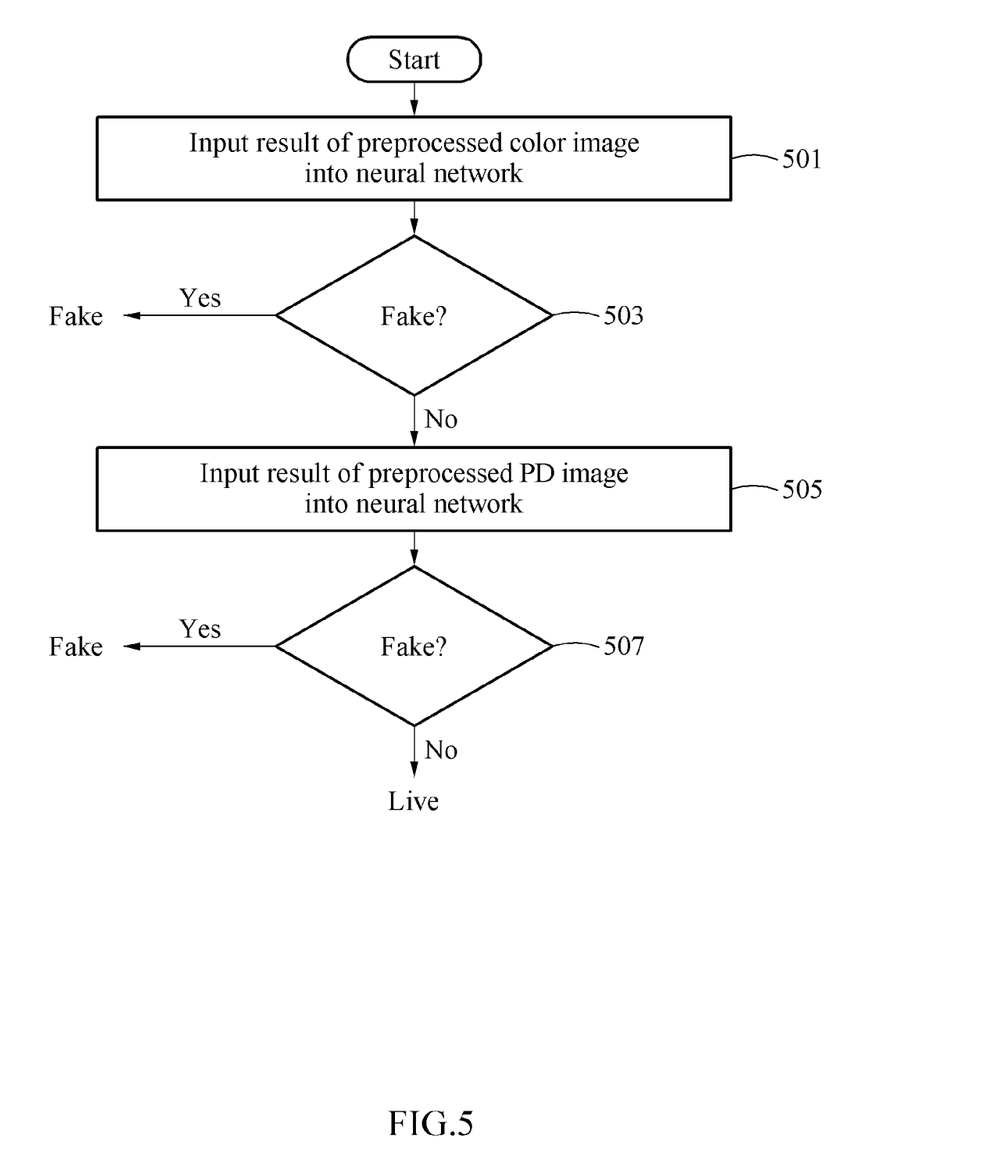
FIG. 5 illustrates an example of an early reject scheme that tests a color image first.

FIG. 5 illustrates an example of an early reject scheme that tests a color image first. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

The liveness test apparatus 120 may perform a liveness test by applying an early reject scheme. The liveness test apparatus 120 may increase the accuracy of user verification through the early reject scheme. For example, the example of FIG. 5 may apply to user verification for a financial transaction.

Referring to FIG. 5, in operation 501, the liveness test apparatus 120 may test a liveness of an object based on a first output of a neural network with respect to a result of the preprocessed color image.

In operation 503, in response to a test result being Fake, the liveness test apparatus 120 may determine the liveness of the object to be Fake. In response to the test result not being Fake, the liveness test apparatus 120 may use a PD image.

In operation 505, in response to the test result being Live, the liveness test apparatus 120 may test the liveness of the object based on a second output of a neural network with respect to a result of the preprocessed PD image.

In operation 507, in response to a test result being Fake, the liveness test apparatus 120 may determine the liveness of the object to be Fake. In response to the test result being Live, the liveness test apparatus 120 may determine the liveness of the object to be Live.

Figure 6:
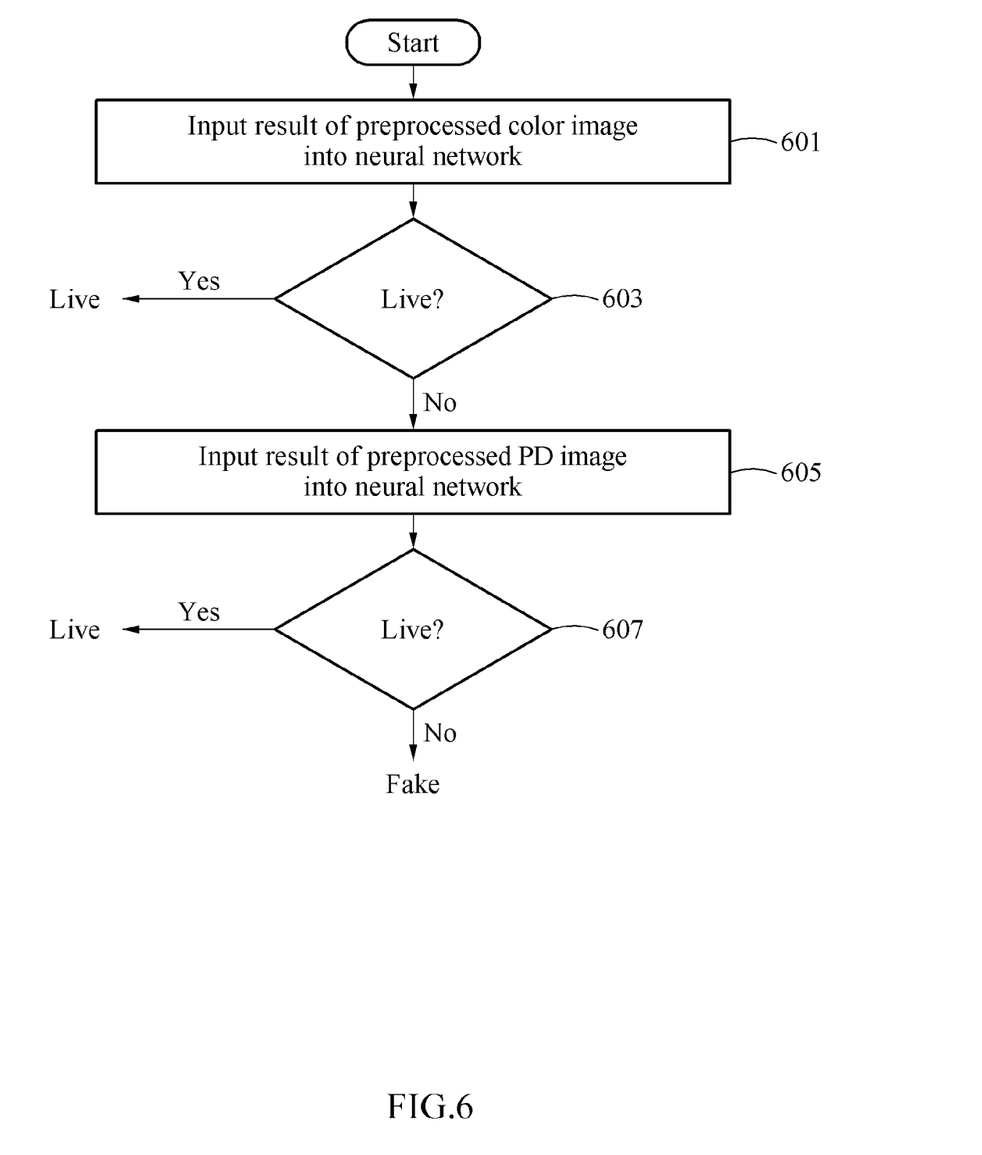
FIG. 6 illustrates an example of an early accept scheme that tests a color image first.

FIG. 6 illustrates an example of an early accept scheme that tests a color image first. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

The liveness test apparatus 120 may perform a liveness test by applying an early accept scheme. The liveness test apparatus 120 may increase the speed of user verification through the early accept scheme. For example, the example of FIG. 6 may apply to user verification for unlocking a screen of a smart phone.

Referring to FIG. 6, in operation 601, the liveness test apparatus 120 may test a liveness of an object based on a first output of a neural network with respect to a result of inputting a preprocessed color image.

In operation 603, in response to a test result being Live, the liveness test apparatus 120 may determine the liveness of the object to be Live.

In operation 605, in response to the test result being Fake, the liveness test apparatus 120 may test the liveness of the object based on a second output of a neural network with respect to a result of inputting the preprocessed PD image.

In operation 607, in response to a test result being Fake, the liveness test apparatus 120 may determine the liveness of the object to be Fake. In response to the test result being Live, the liveness test apparatus 120 may determine the liveness of the object to be Live.

Figure 7:
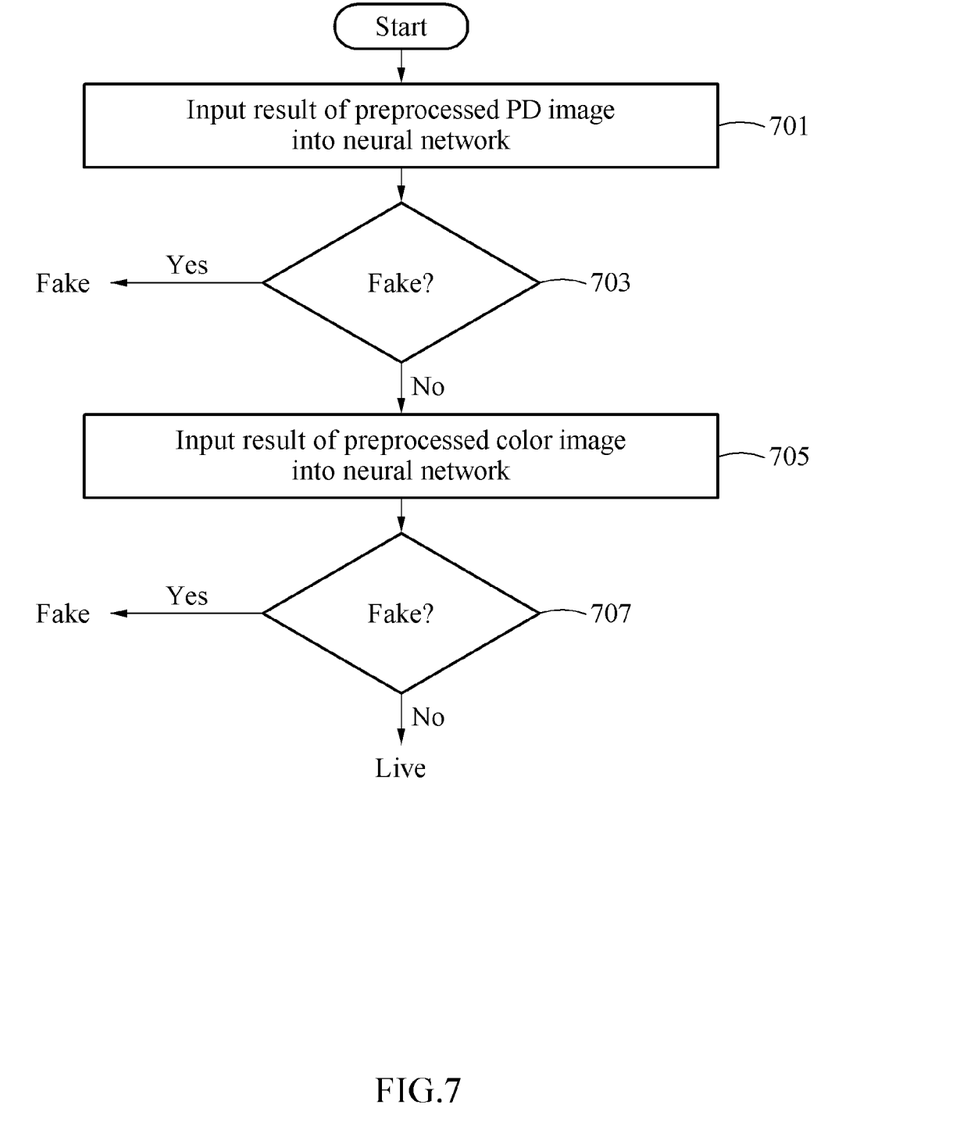
FIG. 7 illustrates an example of an early reject scheme that tests a photodiode (PD) image first.

FIG. 7 illustrates an example of an early reject scheme that tests a PD image first. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer, such as a processor, that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

The liveness test apparatus 120 may perform a liveness test by applying an early reject scheme. The liveness test apparatus 120 may increase the accuracy of user verification through the early reject scheme. For example, the example of FIG. 7 may apply to user verification for a financial transaction.

Referring to FIG. 7, in operation 701, the liveness test apparatus 120 may test a liveness of an object based on a first output of a neural network with respect to a result of a preprocessed PD image.

In operation 703, in response to a test result being Fake, the liveness test apparatus 120 may determine the liveness of the object to be Fake.

In operation 705, in response to the test result being Live, the liveness test apparatus 120 may test the liveness of the object based on a second output of a neural network with respect to a result of a preprocessed color image.

In operation 707, in response to a test result being Fake, the liveness test apparatus 120 may determine the liveness of the object to be Fake. In response to the test result being Live, the liveness test apparatus 120 may determine the liveness of the object to be Live.

Figure 8:
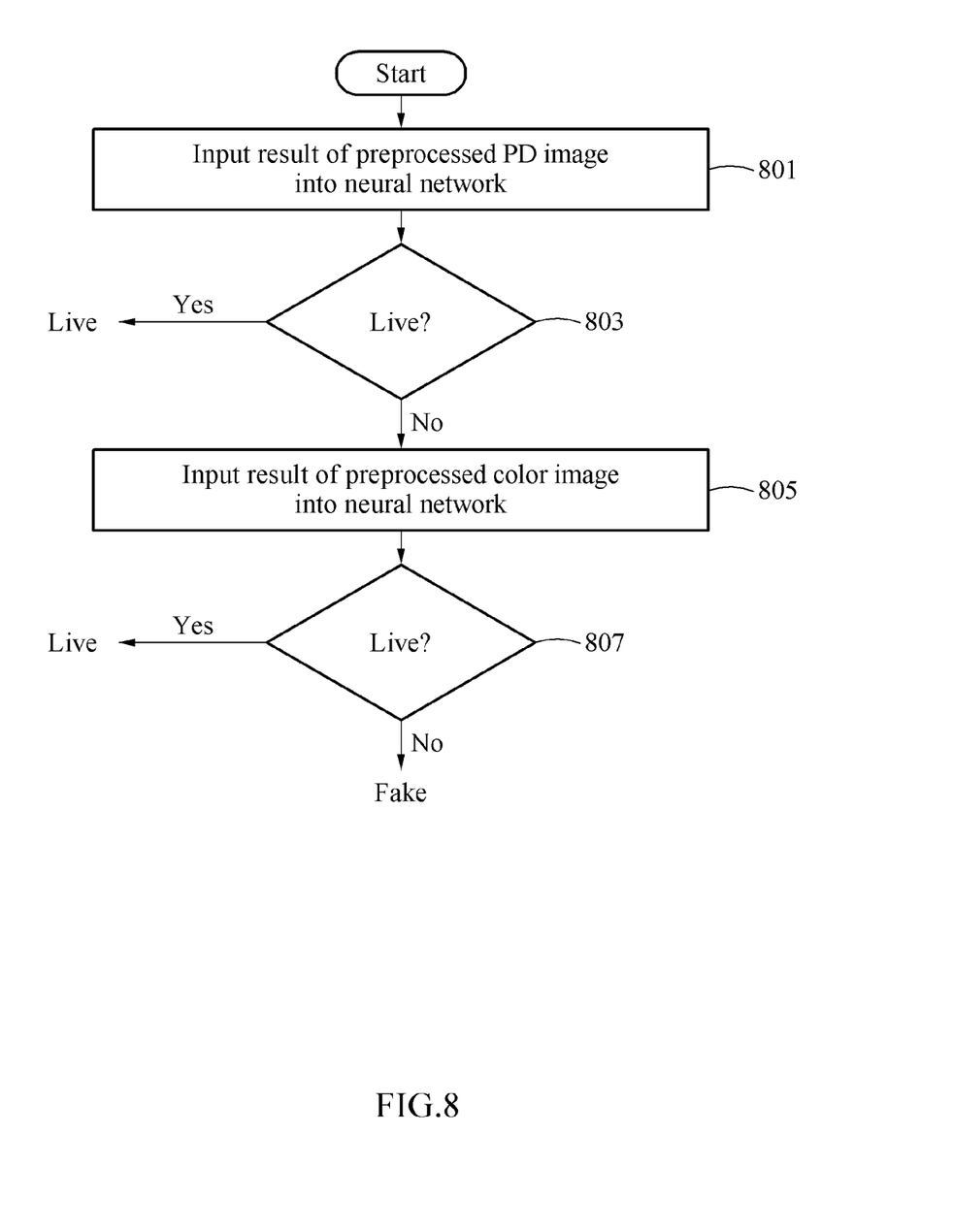
FIG. 8 illustrates an example of an early accept scheme that tests a PD image first.

FIG. 8 illustrates an example of an early accept scheme that tests a PD image first. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. In addition to the description of FIG. 8 below, the descriptions of FIGS. 1-5 are also applicable to FIG. 8, and are incorporated herein by reference. Thus, the above description may not be repeated here.

The liveness test apparatus 120 may perform a liveness test by applying an early accept scheme. The liveness test apparatus 120 may increase the speed of user verification through the early accept scheme. For example, the example of FIG. 8 may apply to user verification for unlocking a screen of a smart phone.

Referring to FIG. 8, in operation 801, the liveness test apparatus 120 may test a liveness of an object based on a first output of a neural network with respect to a result of a preprocessed PD image.

In operation 803, in response to a test result being Live, the liveness test apparatus 120 may determine the liveness of the object to be Live.

In operation 805, in response to the test result being Fake, the liveness test apparatus 120 may test the liveness of the object based on a second output of a neural network with respect to a result of a preprocessed color image.

In operation 807, in response to a test result being Fake, the liveness test apparatus 120 may determine the liveness of the object to be Fake. In response to the test result being Live, the liveness test apparatus 120 may determine the liveness of the object to be Live.

Figure 9:
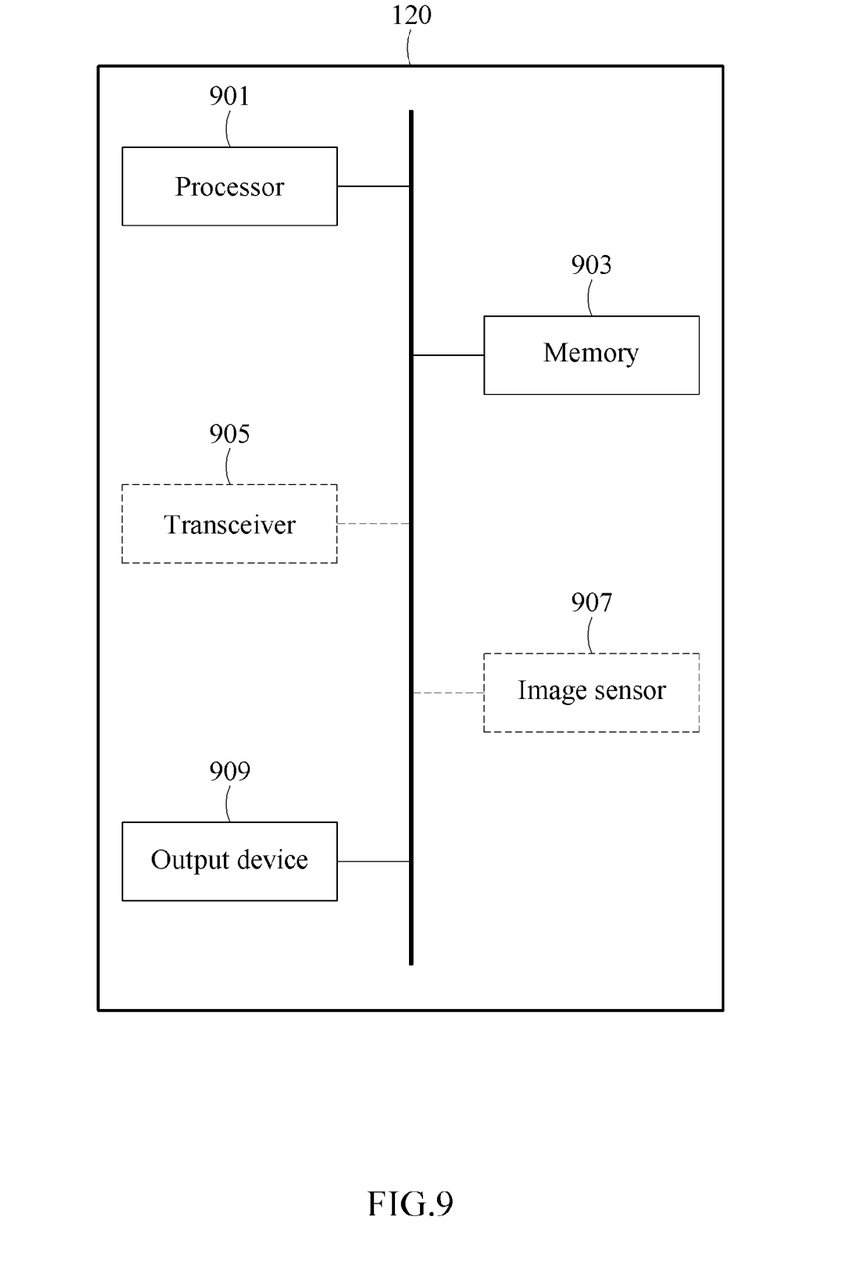
FIG. 9 illustrates an example of a configuration of a liveness test apparatus.

FIG. 9 illustrates an example of a configuration of a liveness test apparatus.

The liveness test apparatus 120 may perform a liveness test using a color image and a PD image providing depth information. The liveness test apparatus 120 may compensate for the weakness of being vulnerable to 2D spoofing attacks by performing the liveness test using the color image and the PD images acquired from the image sensor 130.

To this end, the liveness test apparatus 120 may include at least one processor 901, and a memory 903 configured to store a color image and a PD image of an object received from an image sensor including pixels formed of a plurality of PDs. The liveness test apparatus 120 may further include a transceiver 905, an image sensor 907, and an output device 909.

The processor 901 preprocesses the color image and the PD image. The processor 901 tests a liveness of the object by inputting a result of preprocessing the color image and a result of preprocessing the PD image into one or more neural networks.

The processor 901 may calculate a liveness score based on a first output of the neural network with respect to the result of inputting the preprocessed color image and a second output of the neural network with respect to the result of inputting the preprocessed PD image. The processor 901 may determine the liveness to be Live in response to the liveness score being greater than or equal to a threshold. The processor 901 may determine the liveness to be Fake in response to the liveness score being less than the threshold.

The processor 901 may obtain the liveness score by adding a result of multiplying the first output by a first weight of the color image to a result of multiplying the second output by a second weight of the PD image. In an example, the second weight may be determined based on a proportion of a region of the object to the PD image. In an example, the second weight may be determined based on illuminance information of the PD image.

In another example, the processor 901 may test the liveness of the object based on a first output of the neural network with respect to the result of the preprocessed color image. In response to the test result being Fake, the processor 901 may determine the liveness of the object to be Fake. In response to the test result being Live, the processor 901 may test the liveness of the object based on a second output of the neural network with respect to the result of the preprocessed PD image.

In another example, the processor 901 may test the liveness of the object based on a first output of the neural network with respect to the result of the preprocessed the color image. In response to the test result being Live, the processor 901 may determine the liveness of the object to be Live. In response to the test result being Fake, the processor 901 may test the liveness of the object based on a second output of the neural network with respect to the result of the preprocessed PD image.

In another example, the processor 901 may test the liveness of the object based on a first output of the neural network with respect to the result of the preprocessed PD image. In response to the test result being Fake, the processor 901 may determine the liveness of the object to be Fake. In response to the test result being Live, the processor 901 may test the liveness of the object based on a second output of the neural network with respect to the result of the preprocessed color image.

In another example, the processor 901 may test the liveness of the object based on a first output of the neural network with respect to the result of the preprocessed PD image. In response to the test result being Live, the processor 901 may determine the liveness of the object to be Live. In response to the test result being Fake, the processor 901 may test the liveness of the object based on a second output of the neural network with respect to the result of the preprocessed color image.

The result of the liveness test may be output to an output device 909 with respect to the input image of the current time frame or applied in an application through the output device 909. In an example, the output device 909 is a physical structure that includes one or more hardware components that provide the ability to render a user interface, render a display, and/or receive user input. The output device 909 is not limited to the example described above, and any other displays, such as, for example, computer monitor and eye glass display (EGD) that are operatively connected to the liveness test apparatus 120 may be used without departing from the spirit and scope of the illustrative examples described. In an example, the output device 909 is a physical structure that includes one or more hardware components that provide the ability to render a user interface, render a display, output information, and/or receive user input.

The target liveness test apparatus 120, and other apparatuses, units, modules, devices, and other components described herein with respect to FIGS. 1-9 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIM D) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods illustrated in FIGS. 2-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the liveness test method. In another example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A liveness test method, comprising:
   receiving a color image and a photodiode (PD) image of an object from an image sensor comprising a pixel formed of a plurality of PDs;
   preprocessing the color image and the PD image; and
   determining a liveness of the object by inputting a result of preprocessing the color image into a first neural network and a result of preprocessing the PD image into a second neural network,
   wherein the determining comprises:
     calculating a liveness score based on a first output of the first neural network with respect to the color image and a second output of the second neural network with respect to the PD image; and
     determining the liveness of the object to be live in response to the liveness score being greater than or equal to a threshold, and
   wherein the calculating comprises obtaining the liveness score by adding a result of multiplying the first output by a first weight of the color image to a result of multiplying the second output by a second weight of the PD image, and
   wherein the second weight is based on a distance between the image sensor and the object.

2. The liveness test method of claim 1, wherein the second weight is based on a proportion of a region of the object to the PD image.

3. The liveness test method of claim 1, wherein the second weight is based on illuminance information of the image sensor.

4. The liveness test method of claim 1, wherein the determining comprises:
   testing a first liveness of the object based on a first output of the first neural network with respect to the result of the inputting of the preprocessed color image;
   determining the liveness of the object to be fake, in response to a result of the testing of the first liveness being fake; and
   testing a second liveness of the object based on a second output of the second neural network with respect to the result of the inputting of the preprocessed PD image, in response to the result of the testing of the first liveness being live.

5. The liveness test method of claim 1, wherein the determining comprises:

testing a first liveness of the object based on a first output of the first neural network with respect to the result of the inputting of the preprocessed color image;
determining the liveness of the object to be live, in response to a result of the testing of the first liveness being live; and
testing a second liveness of the object based on a second output of the second neural network with respect to the result of the inputting of the preprocessed PD image, in response to the result of the testing of the first liveness being fake.

6. The liveness test method of claim 1, wherein the determining comprises:
testing a first liveness of the object based on a first output of the second neural network with respect to the result of the inputting of the preprocessed PD image;
determining the liveness of the object to be fake, in response to a result of the testing of the first liveness being fake; and
testing a second liveness of the object based on a second output of the first neural network with respect to the result of the inputting of the preprocessed color image, in response to the result of the testing of the first liveness being live.

7. The liveness test method of claim 1, wherein the determining comprises:
testing a first liveness of the object based on a first output of the second neural network with respect to the result of the inputting of the preprocessed PD image;
determining the liveness of the object to be live, in response to a result of the testing of the first liveness being live; and
testing a second liveness of the object based on a second output of the first neural network with respect to the result of the inputting of the preprocessed color image, in response to the result of the testing of the first liveness being fake.

8. A non-transitory computer-readable storage medium storing instructions that, when executed by a processor, cause the processor to perform the liveness test method of claim 1.

9. A liveness test apparatus, comprising:
a memory configured to store a color image and a photodiode (PD) image of an object received from an image sensor including a pixel formed of a plurality of PDs; and
a processor configured to:
preprocess the color image and the PD image, and
determine a liveness of the object by inputting a result of preprocessing the color image into a first neural network and a result of preprocessing the PD image into a second neural network,
wherein the processor is further configured to:
calculate a liveness score based on a first output of the first neural network with respect to the color image and a second output of the second neural network with respect to the PD image, and
determine the liveness of the object to be live in response to the liveness score being greater than or equal to a threshold,
wherein the processor is further configured to obtain the liveness score by adding a result of multiplying the first output by a first weight of the color image to a result of multiplying the second output by a second weight of the PD image, and
wherein the second weight is based on a proportion of a region of the object to the PD image.

10. The liveness test apparatus of claim 9, wherein the second weight is based on illuminance information of the PD image.

11. The liveness test apparatus of claim 9, wherein the processor is further configured to:
test a first liveness of the object based on a first output of the first neural network with respect to the result of the inputting of the preprocessed color image,
determine the liveness of the object to be fake, in response to a result of the testing being fake, and
test a second liveness of the object based on a second output of the second neural network with respect to the result of the inputting of the preprocessed PD image, in response to the result of the testing being live.

12. The liveness test apparatus of claim 9, wherein the processor is further configured to:
test a first liveness of the object based on a first output of the first neural network with respect to the result of the inputting of the preprocessed color image,
determine the liveness of the object to be live, in response to a result of the testing of the first liveness being live, and
test a second liveness of the object based on a second output of the second neural network with respect to the result of the inputting of the preprocessed PD image, in response to the result of the testing of the first liveness being fake.

13. The liveness test apparatus of claim 9, wherein the processor is further configured to:
test a first liveness of the object based on a first output of the second neural network with respect to the result of the inputting of the preprocessed PD image,
determine the liveness of the object to be fake, in response to a result of the testing of the first liveness being fake, and
test a second liveness of the object based on a second output of the first neural network with respect to the result of the inputting of the preprocessed color image, in response to the result of the testing being live.

14. The liveness test apparatus of claim 9, wherein the processor is further configured to:
test a first liveness of the object based on a first output of the second neural network with respect to the result of the inputting of the preprocessed PD image,
determine the liveness of the object to be live, in response to a result of the testing of the first liveness being live, and
test a second liveness of the object based on a second output of the first neural network with respect to the result the inputting of the preprocessed color image, in response to the result of the testing of the first liveness being fake.

* * * * *